June 11, 1968 P. F. GOOD ET AL 3,388,238

COIN RECORDING MECHANISM

Filed Aug. 26, 1966 11 Sheets-Sheet 1

INVENTORS
PAUL F. GOOD
GORMAN W. WHITE &
JAMES B. EDWARDS

BY Busser, Smith & Harding
ATTORNEYS

INVENTORS
PAUL F. GOOD
GORMAN W. WHITE &
JAMES B. EDWARDS
BY
Busser, Smith & Harding
ATTORNEYS

COIN RECORDING MECHANISM

Filed Aug. 26, 1966 11 Sheets-Sheet 3

INVENTORS
PAUL F. GOOD
GORMAN W. WHITE &
JAMES B. EDWARDS
BY Busser, Smith & Harding
ATTORNEYS INVENTORS
PAUL F. GOOD
GORMAN W. WHITE &
JAMES B. EDWARDS
BY Busser, Smith & Harding
ATTORNEYS

COIN RECORDING MECHANISM

INVENTORS
PAUL F. GOOD
GORMAN W. WHITE &
JAMES B. EDWARDS
BY Busser, Smith & Harding
ATTORNEYS INVENTORS
PAUL F. GOOD
GORMAN W. WHITE &
JAMES B. EDWARDS
BY Busser, Smith & Harding
ATTORNEYS

COIN RECORDING MECHANISM

Filed Aug. 26, 1966 11 Sheets-Sheet 7

INVENTORS
PAUL F. GOOD
GORMAN W. WHITE &
JAMES B. EDWARDS
BY
Bussey, Smith & Harding
ATTORNEYS

COIN RECORDING MECHANISM

INVENTORS
PAUL F. GOOD
GORMAN W. WHITE &
JAMES B. EDWARDS
BY Busser, Smith & Harding
ATTORNEYS

COIN RECORDING MECHANISM

INVENTORS
PAUL F. GOOD
GORMAN W. WHITE &
JAMES B. EDWARDS
BY Busser, Smith & Harding
ATTORNEYS INVENTORS
PAUL F. GOOD
GORMAN W. WHITE &
JAMES B. EDWARDS
BY Busser, Smith & Harding
ATTORNEYS

COIN RECORDING MECHANISM

Filed Aug. 26, 1966 11 Sheets-Sheet 11

INVENTORS
PAUL F. GOOD
GORMAN W. WHITE &
JAMES B. EDWARDS
BY
Busser, Smith & Harding
ATTORNEYS

United States Patent Office 3,388,238
Patented June 11, 1968

3,388,238

COIN RECORDING MECHANISM

Paul F. Good, Timonium, and Gorman W. White and James B. Edwards, Baltimore, Md., assignors to Universal Controls, Inc., Towson, Md., a corporation of Maryland Filed Aug. 26, 1966, Ser. No. 575,377
7 Claims. (Cl. 235—100)

ABSTRACT OF THE DISCLOSURE

A coin recording mechanism suited for use in public transportation comprises means for feeding coins or tokens individually to a measuring position, and means for positioning a shaft in accordance with the diameter of the coin or token. A first counter is operated when the diameter measurement determines that a coin is being measured, and registers the amount of the coin. A plurality of separate counters is provided, each operating similarly to register the quantity of tokens of a particular size. The counters can be caused to print their totals on a record sheet.

This invention relates to a coin recording mechanism and in particular of the type adapted to receive and record coins and/or tokens in buses or other transportation systems.

The invention has as its broad object the provision of a fare box into which coins and/or tokens may be inserted, which box operates to provide on counters an accumulated record of the coins and/or tokens inserted. Provision is made for printing records of what appears on the counters which are, normally, not reset. In brief, when a bus driver starts work he will insert one or more record sheets and print thereon the accumulated total. Then, at the end of his duty, he will again insert the record sheet or sheets and print the new total, so that the difference will indicate fares received during his activities. The respective closing and opening records of successive bus drivers should correspond to each other. This gives a complete record of the activities of the particular bus. The invention may, of course, be utilized in conjunction with turnstiles used in subways or other transportation systems. Specifically, the mechanism is designed to handle both coins and tokens, the latter of various sizes, though in a particular system it may be called upon to handle tokens of only one size. With respect to coins ranging from cents to half dollars, total values of coins are registered, individual coins not being registered, but rather only their cumulative values. Novel mechanism is provided for this purpose having characteristics of simplicity and accuracy and operating irrespective of substantial variations of diameters of coins due to wear. In the case of tokens, in view of the fact that they may have arbitrary values, a separate registration is provided for each size of tokens.

In accordance with the invention, provisions are made to enable the operator to discard slugs or unacceptable tokens, though the discards are retained in the machine to avoid any irregularities. Provision is made for cyclic operation under electrical motor control.

To avoid undue wear on parts and waste of energy, the mechanism operates only when required, with provisions for normally clearing through it an accumulation of inserted coins and tokens.

The general objects of the invention have to do with the attainment of the foregoing operations, and these and others relating to details of construction and operation will become apparent from the following description read in conjunction with the accompanying drawings in which.

For simplicity and consistency of description the mechanism will be referred to as used in a bus. Furthermore, except where it is necessary to distinguish between coins and tokens, references will be made to the handling of coins with the understanding that references to coins include tokens.

Figure 5:
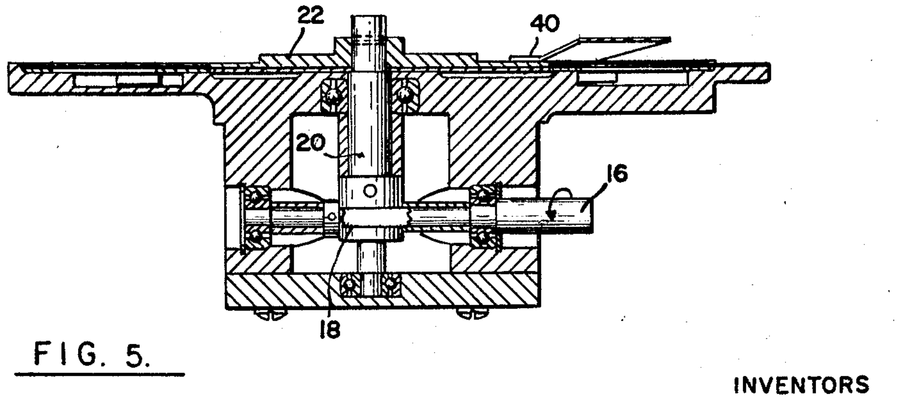
FIGURE 5 is a section taken on the plane indicated at 5—5 in FIGURE 4.
Figures 8, 9:
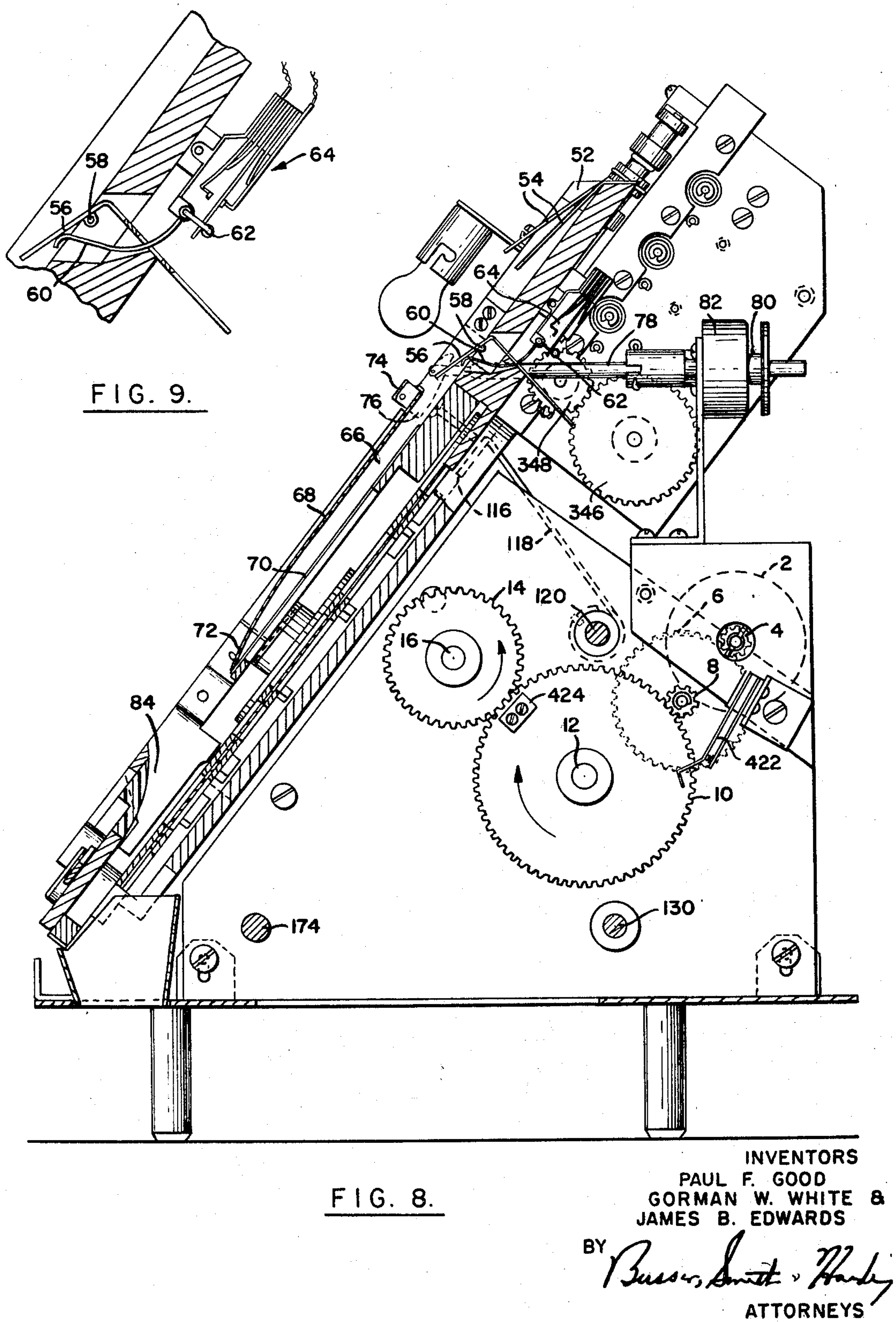
FIGURE 8 is a vertical section taken on the plane indicated at 8—8 in FIGURE 3.
FIGURE 9 is a fragmentary section showing enlarged a switch control illustrated in FIGURE 8.

Considering first the operating mechanism, this is in the form of a unit which involves the mounting of the movable parts on a frame, the construction of which will be apparent as the description proceeds without detailed reference to mounting plates and interconnections. Power operation is from a motor 2 (FIGURE 6) energized by a conventional low voltage system of the bus. The shaft of the motor has secured thereto a pinion 4 driving a gear 6 to which is secured a second pinion 8 in turn driving a gear 10 secured to a shaft 12. The gear 10 (FIGURE 8)

drives a gear 14 secured to a shaft 16. The shaft 16 (FIGURE 5) drives through worm and wheel gearing indicated at 18 a shaft 20 to which is connected through a shear pin arrangement a disc 22 serving as part of an assembly for advancing inserted coins. The shear pin arrangement is provided for safety in the event of jamming of the mechanism due to the passage of an unacceptable inserted element which might possibly pass the scrutiny of an operator and thus not be timely discarded. Under ordinary circumstances the disc 22 is secured to and driven by the shaft 20. It will be noted that the shaft 20 slopes and coin movements are subject to gravitational action as will become evident hereafter.

The disc 22 and its associated parts will be made clear from consideration of FIGURES 3, 4, 5, 8 and 23, the last figure being particularly illustrative of the functional aspects of the parts. The disc 22 has secured to it and under it a second disc 24 provided with a series of lugs 30 defining moveable coin-receiving spaces 28 between the disc 24 and a fixed backing plate 26. The peripheral portions of the discs 22 and 24 are spaced to accommodate a fixed transparent plastic sheet 32, the transparency of which is to enable an operator to view the coins which are being transported. The top moveable disc 22 is provided with openings 34 and the lower disc 24 is provided with openings 36 aligned with the openings 34 and of the same size. The openings 34 and 36 are of a diameter sufficient to accommodate the largest coins (half dollars), but less than twice the diameters of the smallest coins (dimes) or tokens which are used. The thickness of the plate 22 is less than the thickness of the thinnest token or coin to be handled and as will become evident hereafter, this arrangement is such that only one coin or token at a time may be transported by one of the openings 34.

The openings 34 and 36 form a continuous series, being, as shown, twelve in number.

The plastic sheet 32 is annular and imperforate except for an opening 38 through which coins may pass from the openings 34 in the plate 22 through the corresponding aligned openings 36 into the spaces 28, the movement being under the action of gravity, though a blade 40 secured to carrier 42 is arranged to engage the upper surfaces of the coins to insure their movement. The passage of a coin passing in this fashion is indicated at C′ in FIGURE 23.

Figures 1, 2:
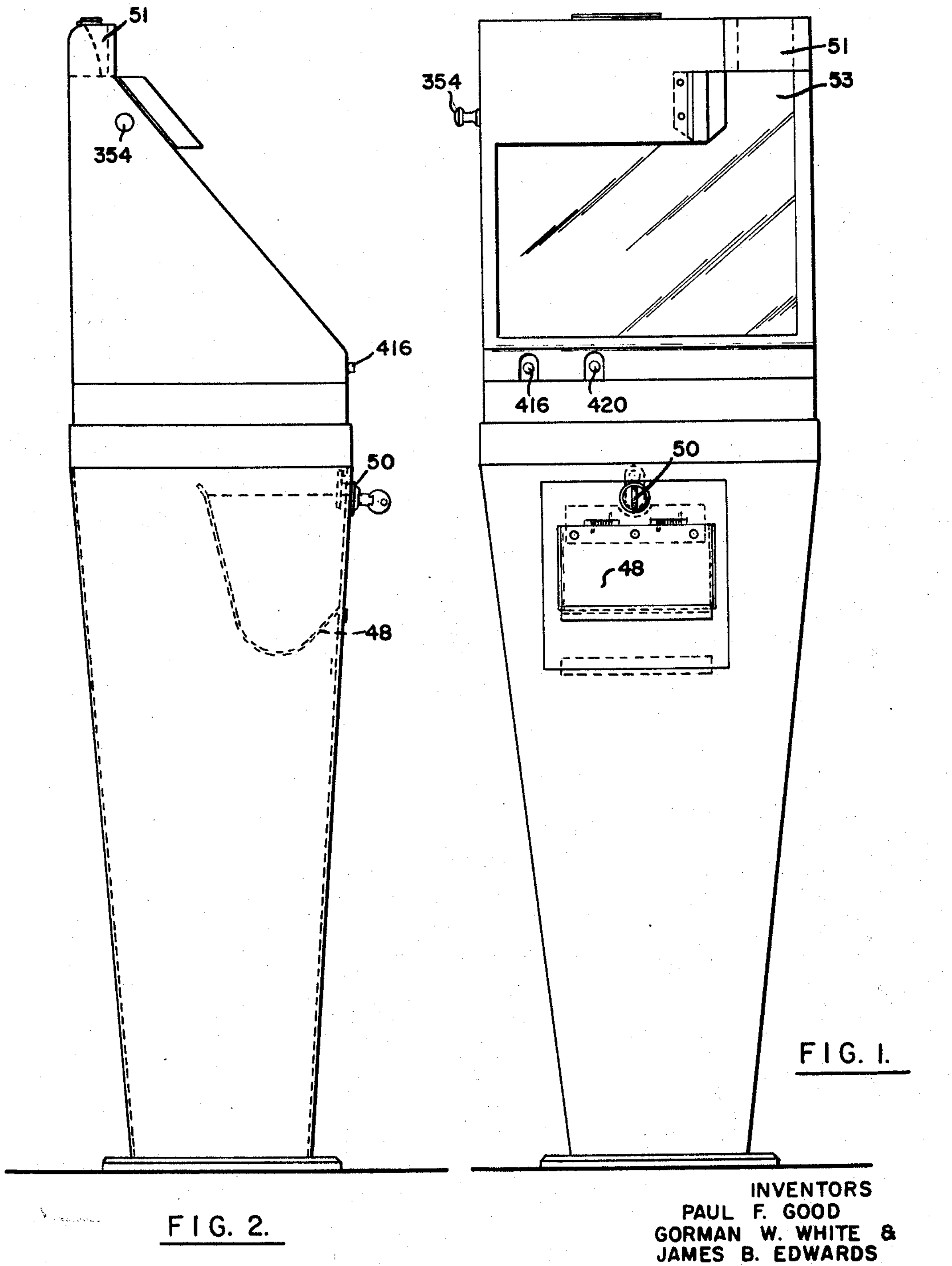
FIGURE 1 is a front elevation of the machine showing its housing which is in part provided by a pedestal which may be located adjacent to a bus driver.
FIGURE 2 is a side elevation of the same.

The fixed plate 26 is also continuous beneath the path of the openings in plate 24 with the exception of the opening at 46 through which the coins are discharged into a receptacle 48 (FIGURES 1 and 2) which is normally locked against access by a door provided with a lock 50. A coin undergoing discharge is indicated at C″ in FIGURE 23.

The plate 26 is provided with an inner annular wall 44 (FIGURE 4) against which the coins rest during the upward portion of their movements.

Coins are inserted into the machine through a passage 51 (FIGURES 1 and 2) and pass into a chute 52 which is closed at its upper and forward side by a transparent sheet 53 forming the face of the upper part of the housing.

Figure 3:
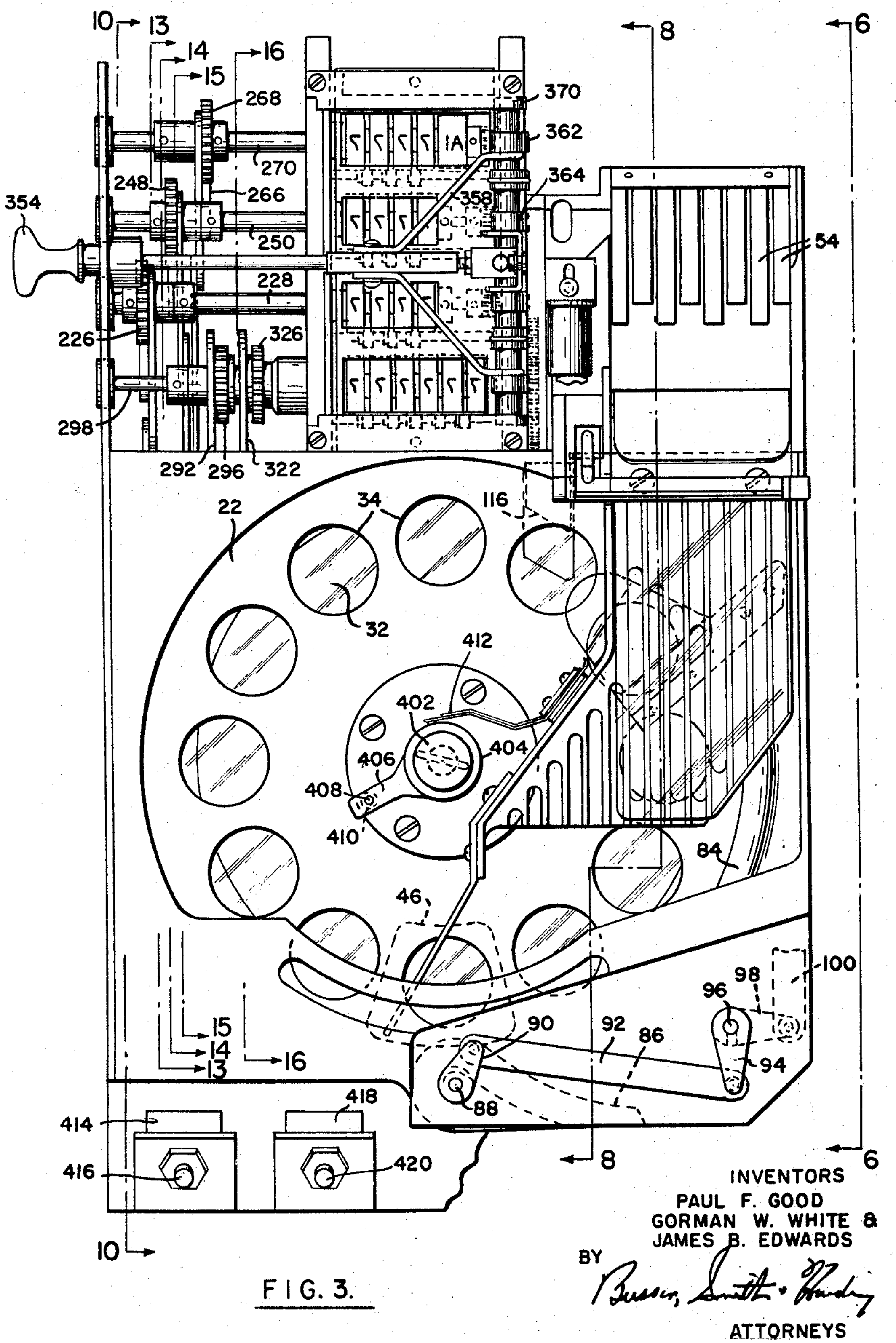
FIGURE 3 is a front elevation of the operating mechanism.

This sheet additionally affords a view of what is essentially shown in FIGURE 3 so that any maloperation may be seen.

Inserted coins depress and clear flexible fingers 54 which are provided to inhibit accidental insertion of transfers, or the like, and prevent tampering by attempted withdrawal of objects which have been fully inserted.

After passing the fingers 54 a coin will engage and deflect a paddle 56 pivoted at 58 and engaging an arm 60 which has a portion 62 serving to deflect the moveable element of a starting switch 64. This arrangement is sufficiently sensitive to effect switch operation when the paddle is engaged by the lightest coin or token which is inserted.

The coin then continues into the portion 66 of the chute over the front of which there extends the flexible transparent plastic strip 68, the bottom of the chute being provided by a series of ribs 70 through which dirt or small objects may readily fall. The lower end of the strip 68 is downturned at 72 to form a temporary closure for the lower end of the chute, though the flexibility of the strip is such that the weight of a coin will cause it to pass below its lower end when it is in the position illustrated in FIGURE 8. However, as will be described hereafter, a temporary clamping action is here desirable. The upper end of the strip is secured to a rocking member 74 provided with an arm 76 engageable by a stem 78 connected to the plunger 80 of a solenoid 82. When the plunger moves toward the left as viewed in FIGURE 8, the strip 68 is forcibly moved counterclockwise to clamp a coin or coins in the chute region 66.

The further downward movement of a coin causes it to enter a guideway 84. A portion of this guideway is open but arranged to be closed by a gate 86 secured to a shaft 88 which is provided with an arm 90 connected by a link 92 to an arm 94 secured to a shaft 96 which also carries an arm 98 connected to the lower end of a link 100 which (FIGURE 6) forms a continuation of a plunger 104 of a solenoid 106, the link being normally held upwardly by a spring 102. The plunger 104 has a flange 108 arranged to engage a lever 110 which, when the solenoid is energized, depresses the button 112 of a microswitch 114. The gate 86 is normally open but is closed by the energization of the solenoid 106. When open the gate permits a coin or other element to drop into a special receptacle in the housing.

A feeler 116 (FIGURES 3, 4, 6 and 8) adapted to engage the edge of a coin, is carried by an arm 118 secured to a shaft 120. When this feeler engages the edge of a coin the coin is backed up by the wall 44 and by one of the lugs 30 so as to have a definite position. The position of the feeler accordingly measures the diameter of the coin when contact exists. The shaft 120 carries an arm 122 and is urged counterclockwise (FIGURE 6) by a spring 123. An adjustable link 126 is pivoted to the arm 122 at 124 and to a member 128 which is journalled on a shaft 130. Secured to the shaft 130 is an arm 131 (FIGURE 10) which is urged by a spring 133 to bring its end normally into contact with a rod 134 which is secured to end members 132 providing a rocking frame which is journalled on the shaft 130, the spring 133 being secured between the arm 131 and one of the members 132. The rod 134 carries rollers 136 which ride in arcuate slots 138 in links which are individual to the different coins and tokens and which normally rest against a fixed transverse pin 140. A rod 142 also extends between the members 132 and serves as a pivot for pawl members hereafter individually described, the members 132 and the rods 134 and 142 constituting the rocking frame. A transverse fixed rod 144 provides a stop as hereafter explained. At rest the frame involving the members 132 is in its extreme counterclockwise position as viewed in FIGURES 10, 13, 14 15 and 16.

During operation the frame is oscillated by a crank 146 secured to the shaft 12 through a link 148 connected at 150 to the frame.

The member 128 journalled on the shaft 130 as stated above mounts a pin 152 which extends into a slot 154 in the lower end of a link 156 which has a pivot pin 158 at its upper end. A spring 160 is connected between the link and a pin 162 carried by a member 164 which is secured to the shaft 130. An edge 166 of member 164 is engaged by a roller 168 carried by the member 128.

Figures 6, 7:
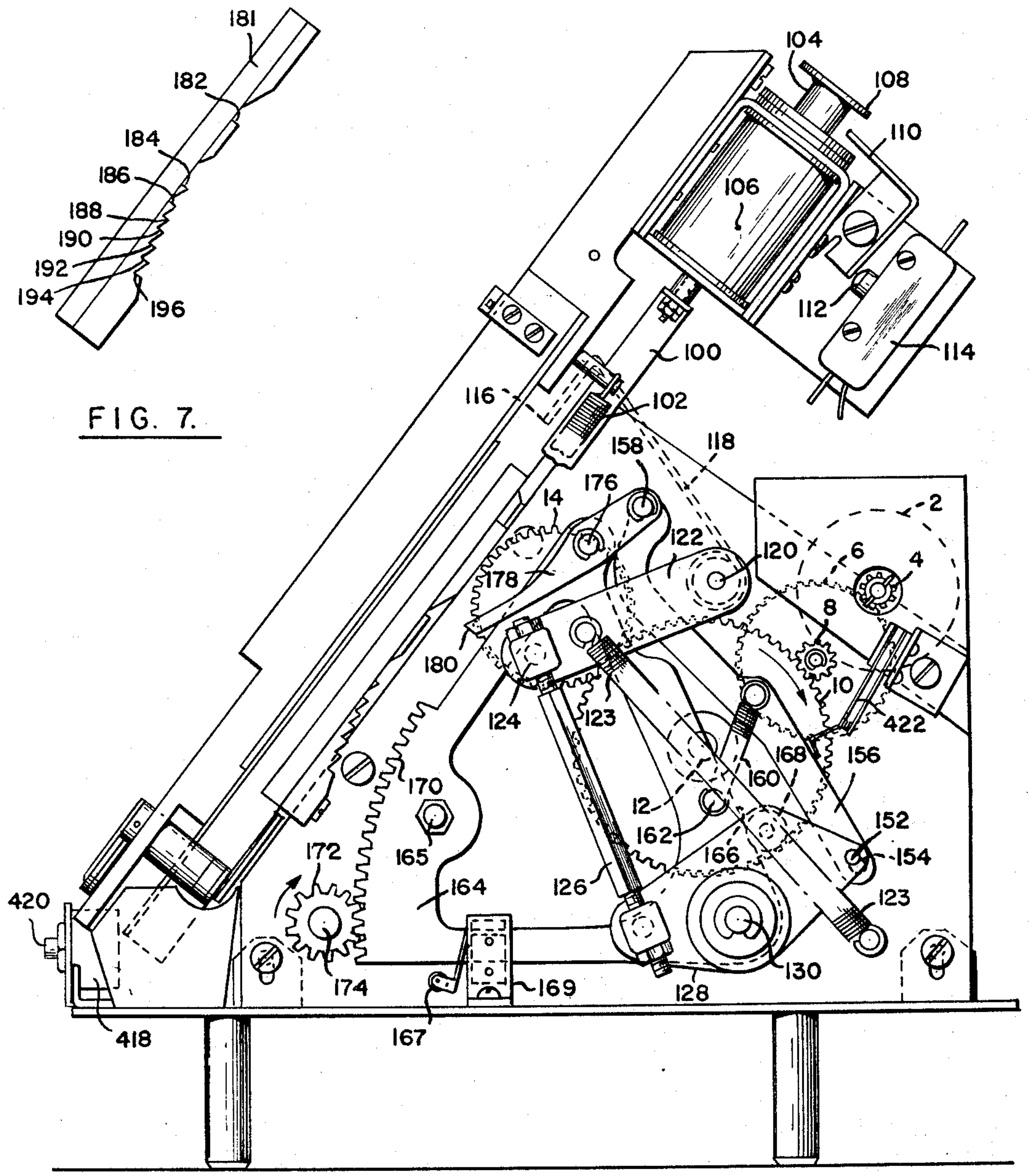
FIGURE 6 is an elevation of the mechanism as viewed from the plane indicated at 6—6 in FIGURE 3.
FIGURE 7 is a fragmentary elevation showing, for clarity, a stop arrangement also appearing in FIGURE 6.

The member 164 carries a toothed segment 170 centered on the axis of shaft 130 and which meshes with a pinion 172 secured to a shaft 174 mounted in the machine frame. Pivoted on a pin 176 carried by the member 164 is a detent 178 provided at one end with a nose 180. The other end of this detent is connected to the link 156 by the pivot pin 158. Referring to FIGURE 7 which shows enlarged an element also appearing in FIGURE 6, this element 181 which is fixed to the frame is provided with a number of stop surfaces 182, 184, 186, 188, 190, 192, 194 and 196 provided by the upper edges of teeth. These stops are engageable by the nose 180 of the detent 178 and as will appear, serve to determine accurately final positions of the member 164 and thus final angular positions of the shaft 174 and elements which it carries. These positions are related to the particular coins or tokens sensed in a cycle of operation, and for convenience of reference it may be noted that the stops correspond to coins and tokens as follows: 182 corresponds to a half dollar, 184 corresponds to a quarter, 186 corresponds to a large size token, 188 to a nickel, 190 to a medium size token, 192 to a cent, 194 to a dime, and 196 to a small size token, the diameters of these being in descending order of magnitude.

Reference may now be made to elements which are individual to the selective operations depending upon particular coins or tokens which are sensed. References will be particularly made to the sections constituting FIGURES 10, 13, 14, 15 and 16 and for convenience it may be noted that FIGURE 10 relates primarily to the sensing of a small size token, FIGURE 13 to the sensing of a medium size token, FIGURE 14 to the sensing of a large size token, FIGURE 15 to the sensing of cents, nickels and quarters, and FIGURE 16 to the sensing of dimes, quarters and half dollars. In explanation of the references to FIGURES 15 and 16, the former effectively counts cents and the latter dimes. The former counts in units of one cent or five cents, and therefore provides registration of pennies, nickels and the five cent portions of quarters. The latter counts dimes, the twenty cent portions of quarters as two dimes, and half dollars as five dimes. In other words, what are added in the accumulator for coins are increments in terms of cents and dimes only, one or five cents being added by the mechanism of FIGURE 15, while one, two or five dimes are added by the mechanism of FIGURES 16.

Figures 10, 12:
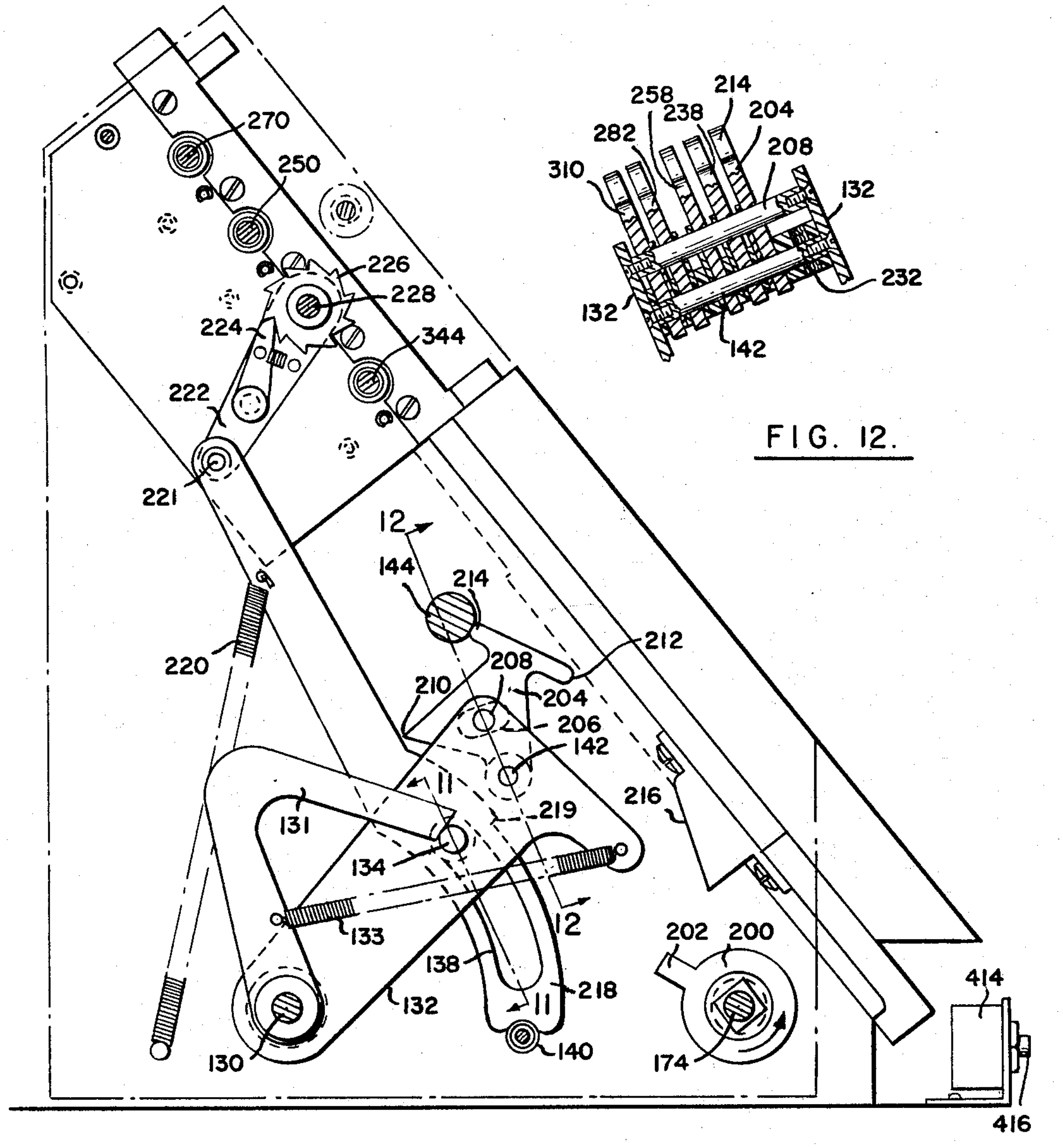
FIGURE 10 is a vertical section taken on the plane indicated at 10—10 in FIGURE 3.
FIGURE 12 is a fragmentary section taken on the plane indicated at 12—12 in FIGURE 10.
Figure 11:
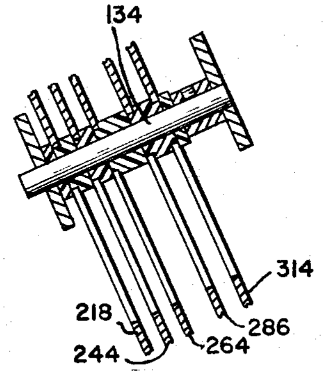
FIGURE 11 is a fragmentary section taken on the plane indicated at 11—11 in FIGURE 10.

Referring to FIGURE 10, the shaft 174 has secured thereto a member 200 provided with a single abutment 202. Pivoted on the rod 142 is a pawl 204 which has a slot 206 surrounding a rod 208 which extends across the oscillating frame, being anchored in the end members 132. The slot and pin arrangement limits movement of the pawl 204. The pawl is provided with an active point 210, and at its outer portion is provided with a pair of contact elements 212 and 214, the former being arranged to engage the abutment 202 while the latter is arranged to engage the fixed rod 144. An alignment cam 216 is provided for the pawl 204 and similar pawls described later.

Figures 18, 19, 20, 25:
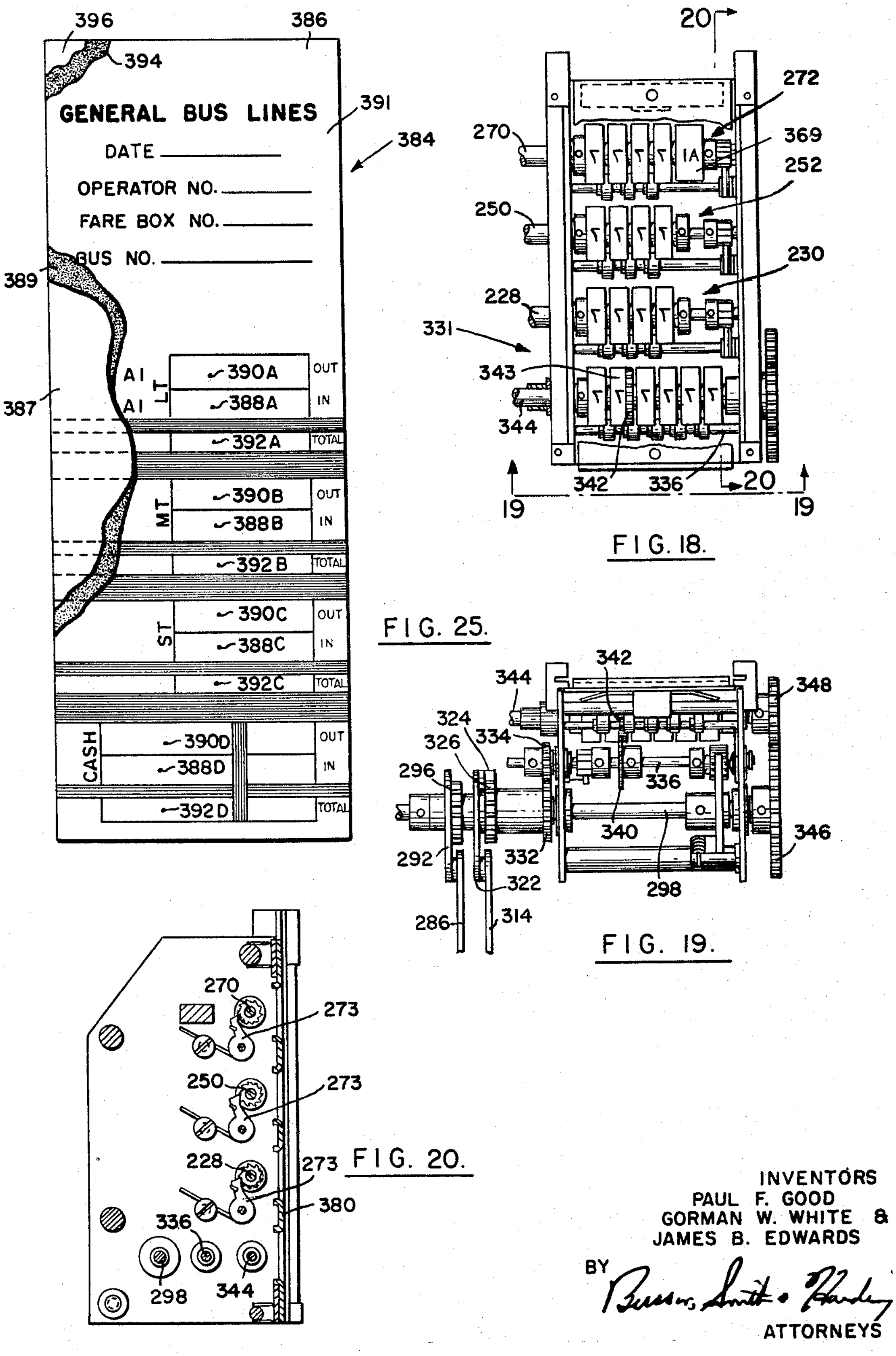
FIGURE 18 is an elevation showing the arrangement of counters.
FIGURE 19 is a view of the counter assembly taken from the plane indicated at 19—19 of FIGURE 18 in the direction of the arrows.
FIGURE 20 is a vertical section taken on the plane indicated at 20—20 in FIGURE 18.
FIGURE 25 is an elevation, with portions broken away of a record sheet assembly on which printing may be produced by a bus driver.

A link 218 having a slot 138 as previously mentioned and arranged to abut the rod 140 is normally held in lowered position by a spring 220 and has its upper end pivotally connected at 221 to an arm 222 carrying a spring urged pawl 224 serving to drive a ratchet 226 secured to the input shaft 228 of a counter 230 (FIGURE 18). In operation the point 210 of the pawl 204 is arranged to engage a notch 219 to lift the link 218. At this point a brief indication of the operation of the elements in FIGURE 10 may be given as follows:

As the oscillating frame moves clockwise, contact element 212 of pawl 204 will engage the abutment 202 if this is in operating position due to the presence of a small token, and the pawl will be rocked into position to engage the notch 219 in the link. In the counterclockwise movement in its oscillation the pawl will raise the link 218 imparting an upward movement to the pawl 224 to advance the counter 230 a unit step, thus counting a small token. Before the end of this counterclockwise movement the pawl will engage the abutment rod 214 resulting in disengagement of the link 218 which will be pulled to its initial position by spring 220.

Referring to FIGURE 12, it may be pointed out that the pawl 204 and other similar pawls which will be referred to later are pressed together, with intervening washers by a group of spring collars 232 to provide friction holding the pawls against free rocking, so that once they are positioned they will retain their positions until rocked relative to the oscillating frame by the action of abutments.

Figures 13, 14:
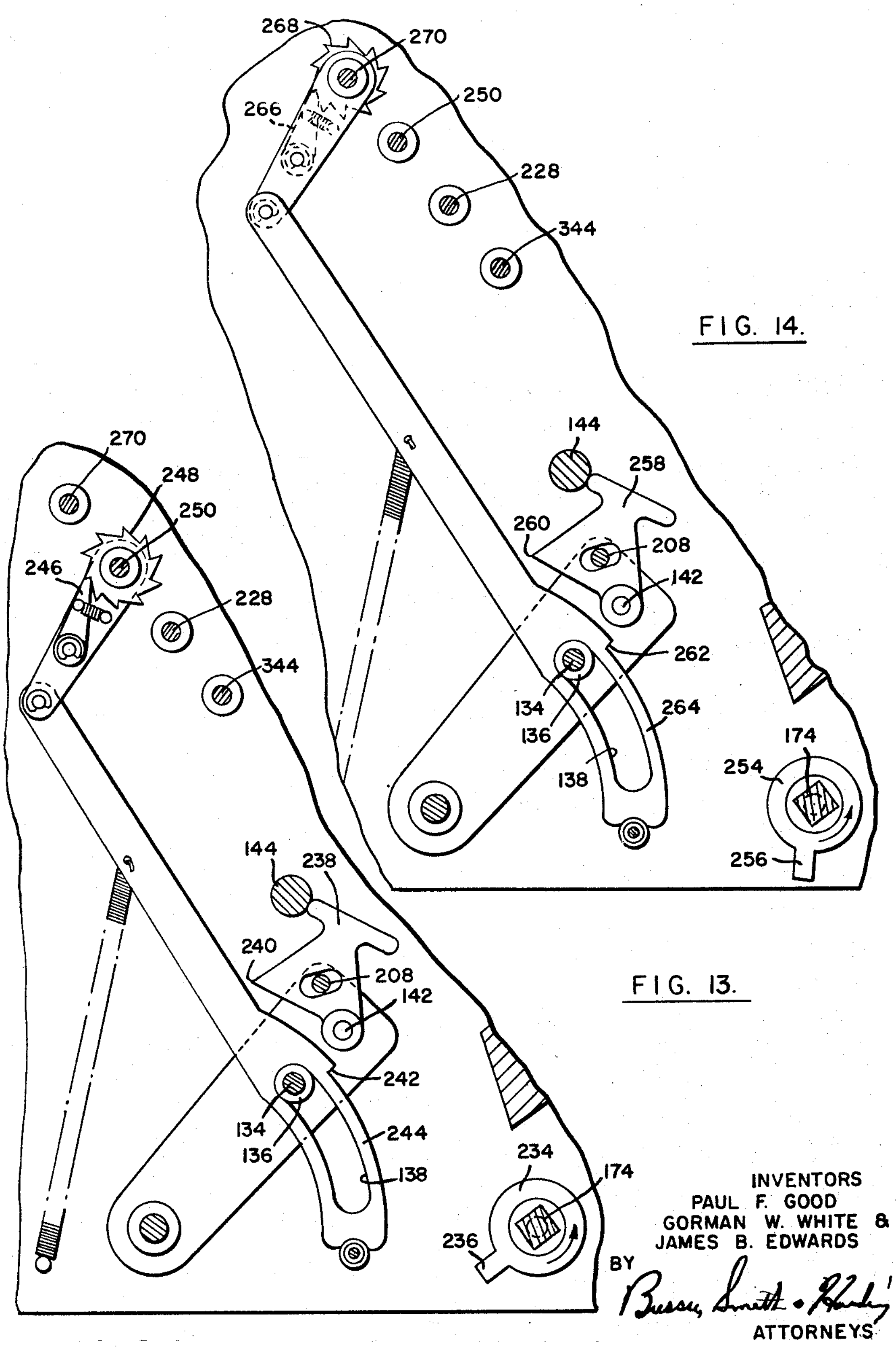
FIGURE 13 is a vertical section taken on the plane indicated at 13—13 in FIGURE 3.
FIGURE 14 is a vertical section taken on the plane indicated at 14—14 in FIGURE 3.

The arrangement for registering a medium size token, illustrated in FIGURE 13, is essentially the same as that just described with reference to FIGURE 10. A member 234 secured to the shaft 174 is provided with an abutment 236. This cooperates with a pawl 238 corresponding to pawl 204 and has a nose 240 engageable with a notch 242 in a link 244 which is arranged to actuate the pawl 246 to drive the ratchet 248 secured to the shaft 250 of another counter 252.

For the registering of large size tokens there is provided the mechanism shown in FIGURE 14 which is similar to that described with reference to FIGURES 10 and 13. A member 254 is provided with an abutment 256 which cooperates with a pawl 258 having a nose 260 engageable with the notch 262 of the link 264 which serves to drive the pawl 266 to advance the ratchet 268 secured to the drive shaft 270 of a third counter 272.

The three counters 230, 252 and 272 so far mentioned are of conventional printing type and have inputs from their drive shafts to the units wheels with the usual provisions for carrying between the digital orders and with detents 273 to prevent reversal (FIGURE 20). In the present machine it is not desired to have provisions for zeroizing since cumulative totals are desired.

Figures 15, 16, 17:
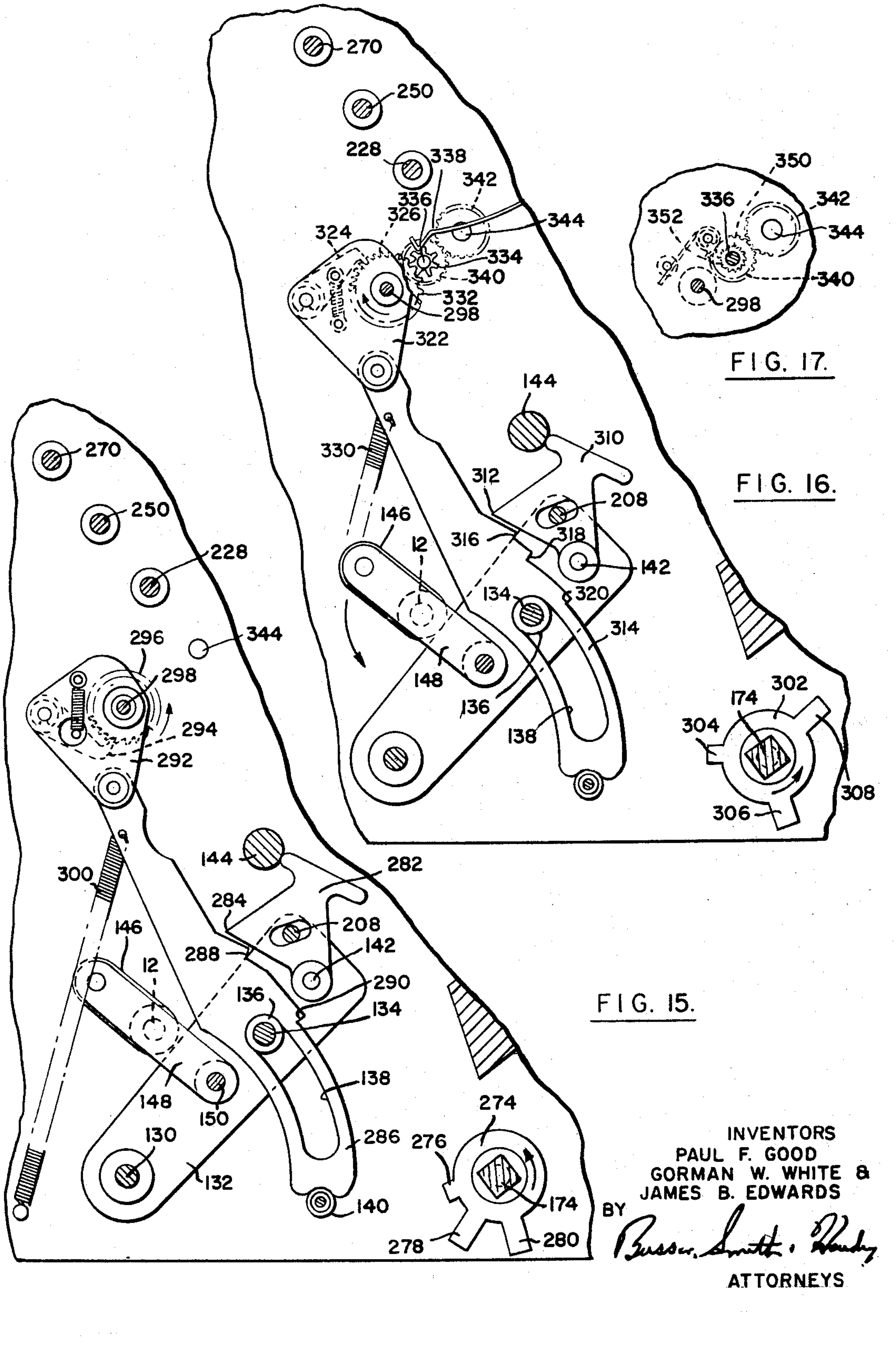
FIGURE 15 is a vertical section taken on the plane indicated at 15—15 in FIGURE 3.
FIGURE 16 is a vertical section taken on the plane indicated at 16—16 in FIGURE 3.
FIGURE 17 is a fragmentary section showing more clearly certain elements shown in FIGURE 16 together with associated elements.

The assembly which counts cent increments, shown in FIGURE 15, has a member 274 secured to the shaft 174, and this has three abutments 276, 278 and 280. The abutment 276 is low, and controls the registration of pennies. The second abutment 278 is higher and produces a five step advance of the unit order of the corresponding counter in order to register nickels. The third abutment 280 has the same height as the abutment 278, but is angularly positioned to provide the registration of a five cent portion of a quarter.

A pawl 282 similar to those previously described is provided with a nose 284 engageable with the link 286 to move it upwardly. In this case, however, there are two notches 288 and 290 provided in the link 286 for engagement by the pawl. The former of these is radially further out from the shaft 130 than the latter. The link 286 is connected at its upper end to the rocking member 292 which mounts the spring-controlled pawl 294 arranged to act upon and advance the ratchet 296 secured to the shaft 298. It will be noted that in this case the advance of the ratchet 296 is in a counterclockwise direction, with the pawl 294 moving idly clockwise during the upward movement of link 286. The spring 300 is arranged to move the link 286 downwardly to advance the shaft 298.

The operation of the elements just described is somewhat different from that previously referred to for the registration of tokens. If the abutment 276 is in operating position, as it will be if a cent is being registered, the clockwise movement of the frame will cause the pawl 282 to engage this abutment and the pawl will be rocked relatively counterclockwise but only to a small extent so that when the frame rocks counterclockwise the nose 284 of the pawl will miss the notch 290 but it will engage the notch 288. As will be evident from FIGURE 15, the resulting upward movement of the link 286 will be short, terminating when the pawl 282 engages the rod 144 to be withdrawn thereby from the notch 288. The upward movement will impart a single tooth idle movement to the pawl 294, and when the link 286 is released the spring 300 will move the link downwardly and effect a single step movement of the ratchet 296 by the pawl 294 in a counterclockwise direction.

On the other hand, if either of the abutments 278 or 280 is in operative position, the former for recording a nickel (as 5 cents) or the latter for recording the 5 cent portion of a quarter, the rocking movement imparted to the pawl 282 will be greater than that involved in the registering of a cent so that as the frame rocks counterclockwise the nose 284 of the pawl will engage the notch 290, earlier in its movement than the engagement of the notch 288 as previously described. The movement imparted to the link 286 corresponds to an idle clockwise movement of the pawl 294 through a distance corresponding to five teeth of the ratchet 296, so that when the link 286 is released by abutment of the pawl 282 with the rod 144 the spring 300 will effect the movement of the ratchet through an arc corresponding to five teeth, imparting a five unit advance to the shaft 298 in a counterclockwise direction.

Referring to FIGURE 16, this shows the assembly for registering 10 cent increments. The member 302 secured to the shaft 174 is provided with three abutments, the abutment 304 being short, the abutment 306 intermediate in length, and the abutment 308 being still longer. The abutment 304 corresponds to the registering of a dime. The abutment 306 corresponds to the registering of 20 cents of a quarter, the registration being in the form of that of two dimes. The abutment 308 corresponds to the registration of a half dollar as five dimes. The pawl 310 provided with the nose 312 serves to raise the link 314 by selective engagement of the notches 316, 318 and 320. The link 314 at its upper end is pivoted to the member 322 which mounts the spring-controlled pawl 324 serving to advance the ratchet which is journalled on, but not connected to, the shaft 298 previously mentioned, the movement of the ratchet being in this case transmitted through gearing which will be later referred to.

It will be noted that in this case the pawl 324 advances the ratchet 326 in a clockwise direction. A spring 330 serves to move the link 314 downwardly. The operation involved is generally similar to that described for FIGURE 15 in the matter of selective movement of the ink 314. If the short abutment 304 is in operative position, the pawl is rocked only to the extent which will cause it to engage the notch 316 to impart only a short movement to the link and a single step advance to the ratchet 326, advance of this ratchet being in the upward stroke of the link. On the other hand, if the abutment 306 is in operative position the pawl nose 312 will engage the notch 318 giving a two-step advance to the ratchet 326. If the high abutment 308 is in operative position, the pawl nose will engage the notch 320 to give a five-step advance to the ratchet 326.

The two coin registering assemblies of FIGURES 15 and 16 control advances of the same counter 331 which is generally conventional except for one minor change which will appear hereafter. To aid in following the mechanical operation, it may be pointed out that in a cycle of operation the assembly in FIGURE 16 advances the counter 331 before advancing is effected by the assembly shown in FIGURE 15. This results from the fact that the advance of ratchet 326 occurs during the progress of the upward movement of the link 314, whereas the advance of the ratchet 296 is effected after the completion of the rise of link 286 upon which the spring 300 moves the link 286 downwardly to provide the counterclockwise rotation of the shaft 298.

Reference may now be made to FIGURES 3, 15, 16, 17, 18 and 19.

The ratchet 326 is secured to a gear 332 which meshes with a pinion 334 secured to a transverse shaft 336. The pinion 334 and its shaft are yieldingly held in indexed position by a spring detent 338.

The shaft 336 has secured to it a gear 340 meshing with a gear 342 which is secured to the "tens" wheel 343 of the counter 331. Except for this particular gear 342 secured to the wheel 343 the counter is conventional, involving the units input shaft 344 with the wheels of the various orders arranged to provide carrying and, as usual, being arranged so that each can advance independently of the wheel of a previous order. In the present case the latter is of effective significance only with respect to the tens wheel which may be advanced independently relatively to the units wheel, though being subject to advance by the units wheel in carrying. The shaft 344 is driven from 298 through the gears 346 and 348. It will be noted that this pair of gears provides a reversal of direction of rotation while the triple gearing sequence to the gear 342 maintains for the tens wheel the same direction of rotation as that of the ratchet 326. In order to secure proper positioning of the tens wheel the shaft 336 carries a toothed wheel 350 arranged to be acted upon by the detent 352.

Printing of a record assembly by the counters 272, 252, 230 and 331 is effected manually. For this purpose an externally projecting knob 354 is secured to a slidably mounted rod 356 which carries a head portion 358 mounting a shaft 360 provided with impression rollers 362, 364, 366 and 368 respectively aligned with the active type faces of the counters and with a slug 369 which may contain a coded type face identifying the machine. Enlarged portions 370 at the ends of shaft 360 are arranged to cooperate with cams 372 having relieved end portions 374 and 376 and arranged to press the rollers against a record form inserted in guide slots 378 in a frame. In order to strip the form from the type at the completion of a printing operation a stripping grid 380 is provided urged forwardly by springs 382. A switch 383 is provided with an arm 385 engageable by the lower end 370 of the moveable printing assembly to effect switch closure when the printing assembly is in its inner idle position.

Figure 21:
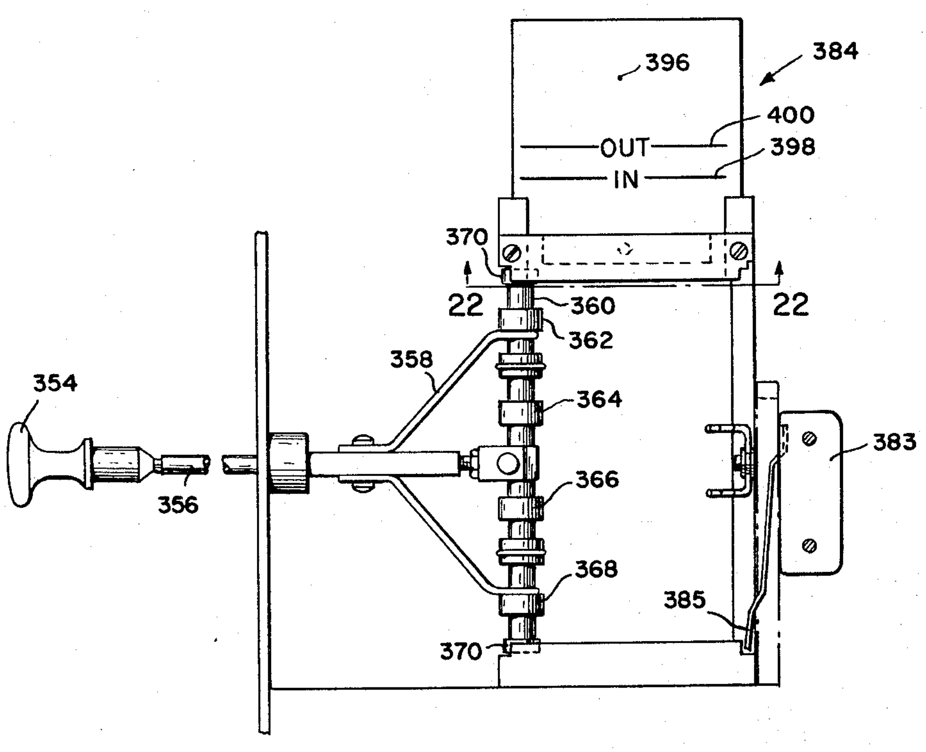
FIGURE 21 is an elevation showing, in particular, the arrangement provided for printing.
Figure 22:
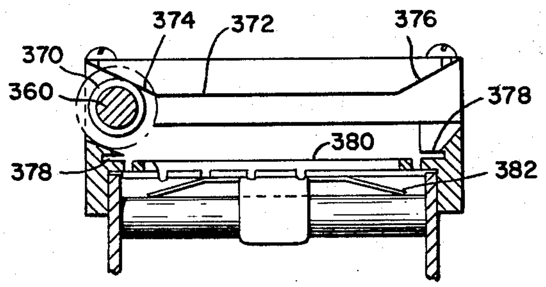
FIGURE 22 is a section taken on the plane indicated at 22—22 in FIGURE 21.

A typical record form 384 which may be used is illustrated in FIGURES 21 and 25. This desirably comprises, secured together, a blank face sheet 387 behind which there is a carbon sheet 389, these being only fragmentarily shown in FIGURE 25 at the left thereof. The main record sheet lies behind the carbon 389 and is shown at 386. In turn, behind this there is a carbon sheet 394 and a backing sheet 396. Printed on the sheet 396 during operation is a duplicate of what appears on sheet 386 and forms a receipt for the bus driver. The sheet 386 may be preprinted as illustrated at 391 to designate areas for filling in various items of information such as the date, the operator number, the fare box number and the bus number. It is also provided with preprinted outlined areas 388A, 388B, 388C and 388D in which the registered counts of the various counters are to be printed when a driver starts his run. Similarly areas 390A, 390B, 390C and 390D are provided for the printing of the registered numbers at the end of a driver's run. Areas 392A, 392B, 392C and 392D are provided for totals of large tokens, medium size tokens, small tokens and cash received during a run, which entries may be made at the central office by subtraction of the respective numbers in the preceding areas.

As shown in FIGURE 21, the back of the form may be imprinted with lines 398 and 400 adapted to be aligned respectively with an edge of the frame to indicate the proper position of insertion of the form for the imprinting of the in and out data.

Before proceeding to a description of the electrical circuitry involved reference may be made to the physical aspects of certain electrical and electromagnetic elements. Referring to FIGURE 3, an insulated cap member 402 is interconnected with the slot in the end of shaft 20 so as to rotate therewith. This carries a conducting cylindrical portion 404 having an arm 406 which is provided with a button 408 engaging a corresponding button 410 carried by the grounded plate 22, so that when the parts are in the relative position shown in FIGURE 3 an electrical contact is provided, whereas if disconnection occurs through breaking of the shear pin previously described this ground connection will be broken. Electrical connection is made to the conducting cylindrical surface 404 by a brush 412 insulated from ground.

A switch 414 is arranged to be actuated by a push button 416 and a switch 418 is arranged to be actuated by a push button 420. The switch 414 is of double pole type. One pole 417 is normally closed and is opened when the push button is operated. The other, 415, is double throw and is normally closed at one contact and engages a normally open contact when the push button is operated.

As illustrated in FIGURES 6 and 8, a switch 422 which is normally open is arranged to be closed by its engagement by a member 424 carried by a gear 10 which rotates clockwise as illustrated in FIGURE 8.

The switch 64 has a normally closed contact 425 and a normally open contact 427 arranged in series. In operation the latter closes before the former opens to provide a short impulse.

Figures 23, 24:
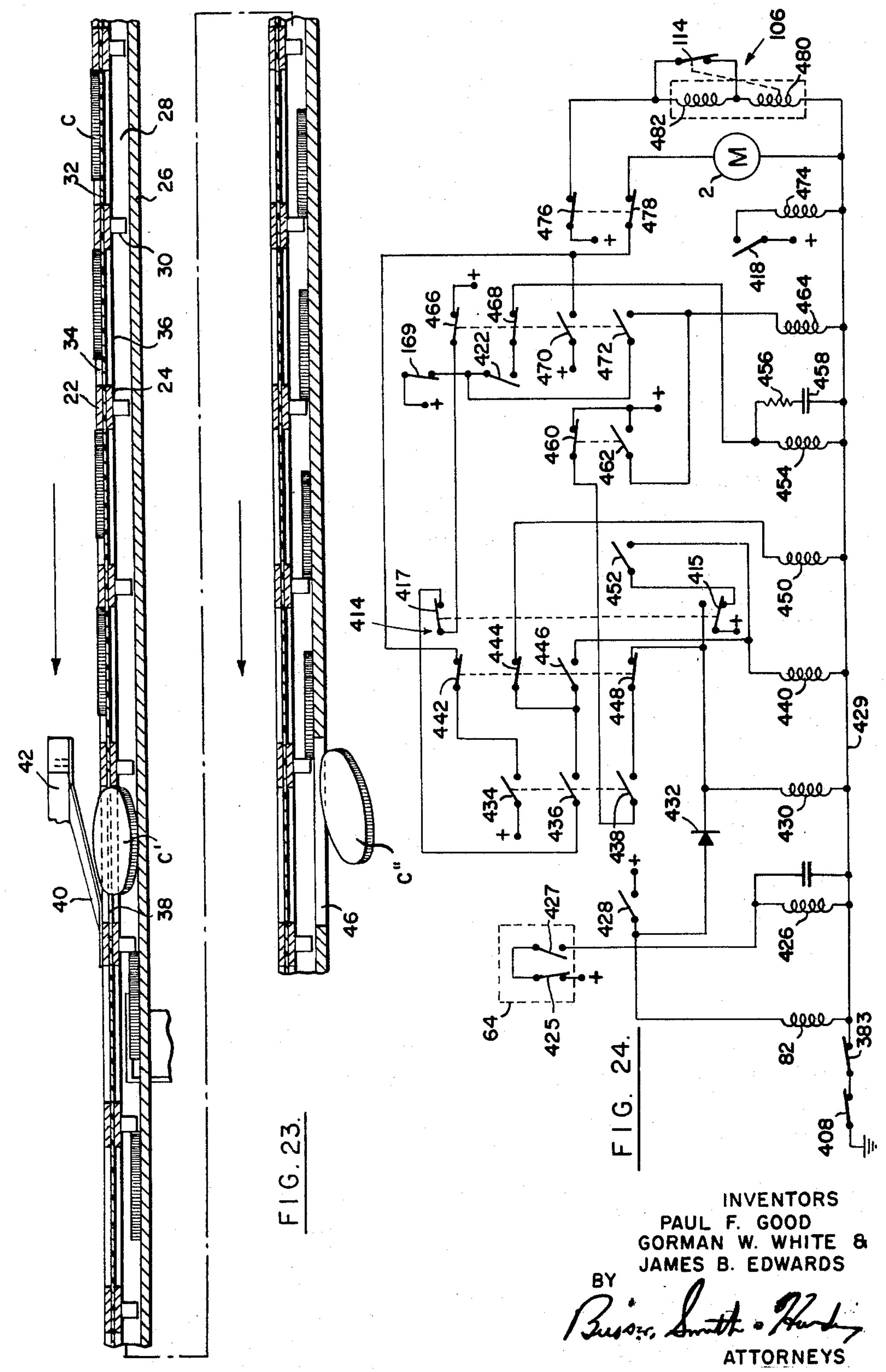
FIGURE 23 is a developed section taken on a cylindrical surface concentric with the coin and token carrier and illustrative of the successive steps involved in the handling of the coins and tokens, the section being viewed in a radial outward direction; the lower portion of this figure being a continuation of the left hand end of the upper portion.
FIGURE 24 is a schematic diagram of the electrical elements and their connections.

FIGURE 24 is a schematic diagram of the interconnections of the electrical elements already mentioned and various relays which are not shown in mechanical form but which may be housed in the machine casing.

A delay relay 426 has a single normally open contact 428, and is of a type which, by reason of the parallel capacitor, when closed by a short current pulse opens only after a short interval such as six-tenths of a second, more or less. It is connected to the normally grounded line 429 which is referred to as such because the switches 408 and 383 are normally closed during operation and connected to the actual ground. The winding of relay 426 is connected between a positive supply terminal and the line 429 through the switch arrangement at 64. It may be here noted that the system is of D.C. type supplied by a conventional rectified power supply or a bus battery which is not shown but which has its negative terminal grounded and its positive terminal connected to the several plus terminals shown in FIGURE 24 separately for convenience.

Another relay 430 has its winding connected to one side of the normally open contact 428, as shown, through a diode 432. The relay 430 has three normally open contacts 434, 436 and 438.

Another relay 440 has the normally closed contacts 442, 444 and 448 and the normally open contact 446.

A further relay 450 is of the time delay type and has a normally open contact 452.

Another relay 454 has its winding shunted by the series arrangement of a resistor 456 and a capacitor 458. It has a normally closed contact 460 and a normally open contact 462.

A relay 464 has normally closed contacts 466 and 468 and normally open contacts 470 and 472.

Still another relay 474 has a pair of normally closed contacts 476 and 478. Its winding is connected to the positive supply terminal through switch 418.

The solenoid 106 has a pair of windings 480 and 482 arranged in series in aiding fashion. The latter of these is normally shunted by the normally closed switch 114. Since a power operation is here involved, this dual winding arrangement is used. When current is supplied, a heavy current flows through the low resistance of the winding 480 and through the switch 114. When the plunger is pulled in, the switch 114 is opened and the resistance of the winding 482 is thrown in series with the resistance of the winding 480. A smaller current then flows, but through both windings, being then ample in value to hold the solenoid energized.

Interconnections of the elements are as illustrated, and these will be best made clear from a functional description of operation during which connections may be traced.

Normal operation is as follows:

Initially the mechanical parts are as illustrated in the drawings with the exception that as soon as power is applied the gate 86 is moved to closed position by energization of the solenoid 106. This provides a "fail safe" system in that, if there is a power failure, inserted coins or tokens will be discarded into the receptacle below the gate.

The various switches, as indicated in FIGURE 24 are positioned as follows:

Switch 408 is normally closed and remains so throughout operation of the machine, being opened only if jamming occurs resulting in shearing of the driving pin and opening of the contact between 408 and 410 (FIGURE 3). Switch 383 is closed except during printing operations. Unless it is closed the machine will not operate.

Switch 64 is effectively open, its contacts 425 being closed but its contacts 427 being open.

Switches 414 and 169 are closed but ineffective by reason of other switch openings in their connections.

Contact 478 is likewise closed but ineffective. Contact 476 is closed and through it the solenoid 106 is energized as stated.

All of the relays are deenergized and the motor is at rest.

Normal operation is initiated by the insertion of a token or coin. As this passes the switch 64 (FIGURE 9) the contact 427 is closed and then the contact 425 is opened with the resulting delivery of a pulse through the winding of relay 426. This relay remains energized for a short interval following its initial energization, the relay being of a delayed opening type. It accordingly closes its contact 428 for a short interval which may be of the order of upwards of a second.

One result of closure of contact 428 is the energization of the solenoid 82 which effects a counterclockwise movement of the plastic strip 68 (FIGURE 8) to hold temporarily the introduced coin or token so that it may be observed by the bus driver. If he finds it to be improper he can effect its discard as will be pointed out later. In the present description of normal operation, it will be assumed that the token or coin is acceptable so that operation will proceed properly, with the coin or token falling into position to be advanced by the disc arrangement.

Another result of the closure of contact 428 is to energize the relay 430 through the diode 432 provided to block reverse transients. The energization of relay 430 closes its contact 438 through which it holds itself energized. This result is achieved by the connection of its winding through normally closed contact 448, the newly closed contact 438, and normally closed contact 460 which are in series running to the positive supply terminal.

While relay 430 is energized, contact 434 is closed and a circuit may be traced from the positive terminal through contact 434, normally closed contact 442, normally closed contact 478 and motor 2 to the normally grounded line. The motor is thus energized to produce the operations which will be shortly detailed. Before proceeding to these, however, mention may be made of the closure of the third contact 436 of the relay 430. Starting with the ungrounded end of the winding of relay 450, a circuit may be traced through normally closed contact 444, the now closed contact 436, and the normally closed contacts 417 and 466 to the positive supply terminal. This starts flow of current through the relay 450 of time delay type of conventional character, which prevents it from becoming energized until after a suitable time interval. The time interval may be rather arbitrarily chosen, but is such that the machine motor will continue to operate through a time interval represented, desirably, by the time required for the disc 22 to rotate through the angular spacing of several, for example five or more, of the openings 34. In brief, the relay 430 which will eventually be deenergized through a train of events after the relay 450 becomes energized, will remain active to maintain closed its contacts to hold itself energized and to energize the motor 2.

Figure 4:
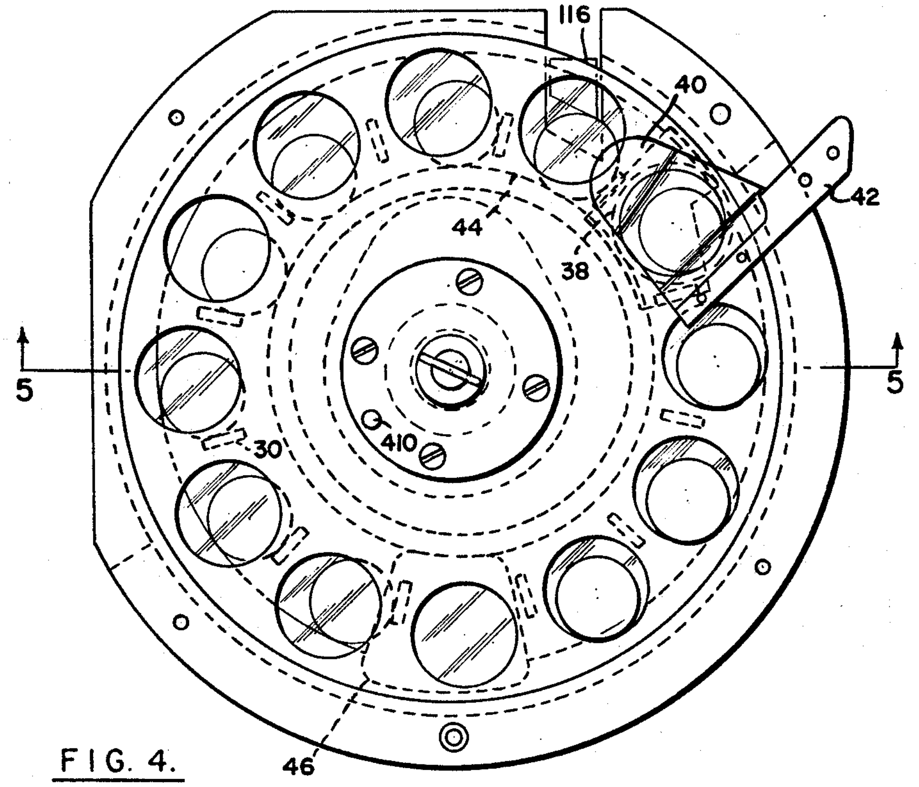
FIGURE 4 is a front elevation showing, particularly, a coin and token advancing device with coins or tokens illustrated to indicate their successive locations.

As the coin disc assembly rotates, the coin or token is picked up by one of the openings 34 to slide over the sheet 32 until it reaches the position of the opening 38 whereupon it drops into a chamber provided between a pair of lugs 30. It is thereafter advanced along the fixed plate 26 by a lug arriving at the position of the feeler 116 at which time it is backed up by a lug 30 and by the wall 44 (FIGURE 4). It may be here pointed out that the inserted coin or token which has been referred to may not reach the position of measurement by the feeler 116 during cycles immediately following its insertion. The measurement effected may be of a previous coin or token. The measuring means goes through a cycle each time the disc assembly reaches a position in which measurement could be effected if a coin or token was present; in other words, a measuring cycle takes place for each twelfth of a revolution of the disc assembly. The description will now proceed on the assumption that a coin or token is positioned for measurement adjacent to the feeler 116. Of course, if none is present, an idle operation occurs.

The crank 146 secured to the shaft 12 rocks the frame 132 clockwise as viewed in FIGURES 10, 13, 14, 15 and 16. It will be noted that this movement (of associated parts) corresponds to a counterclockwise movement in FIGURE 6. The arm 131 (FIGURE 10) follows the pin 134 carried by the frame under the action of strong spring 133 and imparts movement to the shaft 130 to which it is secured. This shaft has secured to it the gear segment 164.

As rocking takes place, the lever 128, which is journalled on the shaft 130 also rocks under the action of the spring 123 and with it there is rocked through the link connection 128 the feeler 116. This feeler 116 may move until it is arrested by the coin or token in measuring position. When engagement occurs, the lever 128 is stopped. The segment 164 continues to move, carrying with it the pivot 176 of the member 178, the pin 158 secured to the link 156 being arrested after a slight movement taking up the clearance of the pin 152 in the slot 154. The result of this is that the lower end 180 of the member 178 is rocked outwardly to engage one of the arresting surfaces of the member 181 shown in FIGURE 7. When one of these surfaces is engaged the segment 164 is arrested resulting in stopping of the shaft 130 so that further movement of the rocking frame 132 withdraws the pin 134 from the end of lever 131, the spring 133 yielding to permit this. The rocking of the detent 178 is so rapid that no positioning error arises due to the slow and continuous advance of the corner discs; a coin or token is actually measured while moving.

The purpose of what has just been described is to insure a definite position of the segment 164 irrespective of diameter variations of coins or tokens such as may result from wear and irrespective of the continuous movement of the coins or tokens. If arrest of the segment was dependent on the coin or token diameter, inaccuracy of setting of the segment would result. With the described arrangement, so long as the diameter is within a tolerance range, the end of the member 178 will be projected, with some variations, between a pair of arresting surfaces on the member 181. A slight but variable further movement of the member 178 occurs and the arrest of the parts takes place due to engagement of one of the surfaces of the group 182, 184, 186, 188, 190, 192, 194 or 196, which surfaces are accurately located and not subject to wear. Thus, irrespective of variations of coin or token diameters a definite position of the segment 164 is achieved, and with it a definite ange of shaft 174 is determined, the segment 164 driving the pinion 172. The attained position is then held even though the coin or token thereafter clears the feeler.

The result, then, is definite positioning of the members 200, 234, 254, 274 and 302 shown in the respective FIGURES 10, 13, 14, 15 and 16. In the absence of any coin or token, the segment is not averted and makes a full stroke rotating shaft 174 to a position on which no projection thereon is operative.

The rocking frame 132 continues in a clockwise direction as viewed in the last mentioned figures to produce at the end of this movement the abutments of the members 214, 238, 258, 282 and 310 with the projection or projections of the members carried by the shaft 174 if any of these are in operative position. Following this the frame 132 rocks counterclockwise through the action of the crank 146 back to its initial position, with return of the parts to their initial positions.

The resulting actuations of the counter driving pawls are as already described in detail, and these actions need not be here repeated. In brief, advances are imparted to the counter shafts, these advances taking place for the shafts 228, 250, 270 and 298 during the counterclockwise movement of the frame 132 while in the case of the assembly shown in FIGURE 15 the pawl 294 is moved idly to a retracted position and when the pawl 284 is released by engagement of 282 with the rod 144 near the end of the frame movement the spring 300 produces an advance of the shaft 298. As already pointed out, while in the case of tokens only one assembly is advanced, in the case of quarters two assemblies will be advanced.

The initiation of motor operation by energization of relay 430 has already been mentioned. As will be later described, this relay is ultimately deenergized after a substantial time interval, in general following failure to detect a coin or token, as later brought out, and, to effect most desirable characteristics of operation, after part of a cycle continued operation of the motor is established through auxiliary controls which are effective even if the relay 430 is deenergized. After the shaft 12 has rotated through a little more than 90° the member 424 carried by gear 10 closes for a short interval the switch 422. Referring to FIGURE 24, when the switch 422 is closed there may be traced a circuit from the positive supply terminal through closed switch 169, through switch 422, through closed contact 468 of relay 464 and through the winding of relay 464 to the normally grounded line 429 so that the relay 454 is energized. The energization of 454 results in closure of contact 462 through which a connection is made from the positive supply terminal through the winding of relay 464. Energization of relay 464 closes its contact 472 and this results in a holding action since the winding of relay 464 is connected to the positive terminal through contact 472 and switch 169. At the same time there is closed the contact 470 which provides a connection between the positive terminal and through closed contact 478 to the motor to maintain its operation. Energization of relay 454 will open contact 460 taking away from the relay 430 control of the motor. The energization of relay 464 opens contact 468 to deenergize the relay 454, and contact 460 is again closed. At the same time contact 462 is opened, but relay 464 remains energized by the holding arrangement previously mentioned. Contact 466 is opened to interrupt the energizing current which would ultimately cause relay 440 to become operative, with an effective result which will become apparent later.

The continued energization of relay 464 maintains the motor operating, and so far as it is concerned the stopping of operation will occur only when, in a cycle of operation there is no coin or token in position to be measured. As described above, when a token or coin is measured the gear segment 164 is arrested short of the limit of its possible counterclockwise movement as viewed in FIGURE 6. If coins or tokens are in position to be measured in each of successive cycles of operation, during these cycles the gear segment is so arrested short of its possible movement that the pin 165 will not engage and open the switch 169. However, if in one of the measuring cycles there is no coin or token in position to be measured the gear segment will not be arrested and the pin 165 will then open the switch 169. As will be seen from FIGURE 24, the holding of relay 464 through its contact 472 depends on the closed position of switch 169, so that when this switch is open the relay 464 is deenergized and contact 470 opens removing power from the motor 2 unless power is supplied through relay 430 (as is normally the case) so that the motor will stop.

The last aspect of operation is to provide operation continuously as long as a series of coins or tokens follow each other representing substantial loading of the register. This represents a maintenance of operation due to loading.

Additionally, however, it is desirable to maintain operation for a time interval to measure coins or tokens which may newly appear in the register but which require a plurality of idle cycles before they reach measuring position. It may be here mentioned that, of course, the register could operate continuously. But in the interest of minimizing wear and of conservation of power it is desirable to have operation occur only when required. From the standpoint of observers, the mechanism will ordinarily be at rest; it will operate at a bus stop when a first entering passenger inserts a fare; it will continue operating to digest all coins or tokens introduced at that bus stop, and will then stop until another fare is inserted at a later bus stop. Reverting back to the operation initiated by insertion of a coin or token and resulting in the energization of the relay 430, reference has already been made to the self-holding connections of the winding of relay 430 through closed contact 448 of deenergized relay 440, self-holding contact 438 and contact 460 of deenergized relay 454 to the positive terminal, and reference has also been made to the closure of the motor control contact 434. However, there is a further contact 436 closed by energization of relay 430. A circuit may be traced from the winding of relay 450 through the closed contact 444 of deenergized relay 440, through now closed contact 436 of relay 430, through the normally closed contact 417 of the manually operated switch 414 and through the normally closed contact of deenergized relay 464 to the positive supply terminal. The relay 450 is thus energized, but being a time delay relay it will not pull its contact 452 until after a substantial interval of time determined by its construction or adjustment. Accordingly, the original conditions prevail for this interval and set a time for operation of the motor after its initiation into operation. After the time interval, however, the contact 452 will close. It will be noted that there is then a closed circuit running from the winding of relay 440 through contact 452 and through the normally closed contact 415 of switch 414 to the positive supply terminal. This energizes the relay 440 opening contact 448. The opening of contact 448 breaks the self-holding circuit of relay 430 which is accordingly deenergized and this will result in stopping of the motor unless the motor is subject to the auxiliary control already described. The energization of relay 440 closes contact 446. This is merely to insure energization of the relay 440 until the contact 436 is opened. Contact 444 is opened by energization of relay 440 to open the circuit to the time delay relay 450.

When contact 466 is opened by the energization of relay 464 the energizing circuit for the time delay relay 450 is opened, and thus, once this relay 464 is energized, the time delay operation is postponed until relay 464 is deenergized by reason of the absence of a token as previously described. Therefore, an aspect of continuous operation is maintained which may be illustrated by the following:

Suppose multiple coins are inserted in the register. Relay 430 will be energized. Before the first token reaches the measuring position several cycles will occur and the time delay relay will have started its time measurement, but operation will be maintained until the first coin reaches measuring position. On each cycle the switch 422 will be closed, but so long as no token is measured in these preliminary cycles the relay 464 will be opened by the opening of switch 169. The timed delay should bring the first coin into measuring position; and then the relay 464 effectively takes over the job of maintaining operation, and in doing so the time delay relay is cut off from its source of power so that it remains ineffective. Successive coins of the group introduced will now be measured in successive cycles of operation as determined by the operations involving relay 464. Through this time the relay 430 will continue energized and motor power will be supplied through parallel paths. As soon as a coin is not measured, the relay 464 goes out of operation and then the time delay relay starts a timing operation. This will cause a continuation of a plurality of cycling operations. If during them no other coin is measured the motor will eventually stop due to deenergization of the relay 430. However, if even after several cycles another coin is measured the cycling will again continue until by elapse of time stopping occurs.

It may happen that the operator may notice that stoppage occurred while one or more coins or tokens are in position in which they should be picked up by the discs but for some reason had not been picked up. He may ignore this if it is expected that additional coins or tokens will be introduced. But if this occurs at the end of a run he will wish to complete the registration or merely operate the device to insure that all coins are discharged from the disc assembly. Manual operation may be provided by closure of the switch 414, in which case a plurality of cycles will take place even in the absence of coins or tokens. It will be noted that this result follows by the movement of the switch contact 415 to its upper position to energize the relay 430.

If it is noted that a slug or some other body is entered in the register, manual closure of switch 418 will result in opening of the discard gate. This, it will be noted, provides emergency stop of the motor to prevent damage. It will be evident that after an emergency stoppage there may be resumption of normal operation either manually or by a fare insertion.

In the event of jamming, the switch 408 is opened by reason of shearing of the driving pin and this renders inoperative the entire electrical system by removal of the connection of line 429 to ground.

When printing of the record assembly is to be accomplished the knob 354 is pulled out, and this opens the switch 383 which also disconnects the line 429 from ground rendering the electrical system inoperative. It may be noted that in either case of this disconnection the solenoid 106 is deenergized opening the discharge gate.

A printing is effected as already indicated by placement of the record assembly in position after the knob 354 is pulled out and then pushing the knob inwardly to provide the impression printing.

As used in the claims, the word "tokens" is used to include coins as well as tokens in the commercial sense of elements representative of value but not issued under government authority.

It will be evident that various modifications in details of the apparatus may be made without departing from the invention as defined in the following claims.

What is claimed is:

1. Recording mechanism for coins of at least the denominations nickels, dimes and quarters comprising means providing a receptacle for the coins, means for advancing the coins singly from said receptacle to a point of measurement, measuring means at the point of measurement movable to engage, and be positioned by, an edge of a coin to measure a transverse dimension thereof, a counter, a first assembly controlled by said measuring means to enter into said counter a five cent increment when a nickel is measured, and a second assembly controlled by said measuring means to enter into said counter a ten cent increment when a dime is measured, said first assembly being arranged to enter into said counter a five cent increment and said second assembly being arranged to enter into said counter two ten cent increments when a quarter is measured.

2. Recording mechanism according to claim 1 in which said first assembly enters into said counter a one cent increment when a penny is measured.

3. Recording mechanism according to claim 1 in which said second assembly enters into said counter five ten cent increments when a half dollar is measured.

4. Recording mechanism according to claim 1 in which the entries made into said counter when a quarter is measured are made sequentially.

5. Recording mechanism for tokens comprising means providing a receptacle for tokens, means for advancing tokens singly from said receptacle to a point of measurement, measuring means at the point of measurement movable to measure a transverse dimension of a token, at least one counter, means controlled by the measuring means to enter into the counter an increment corresponding to the token measured, means cyclically moving said measuring means with each cycle corresponding to a possible location of a token at said measuring point, driving means for the last mentioned means and said token advancing means, and means maintaining said driving means operating for a limited time interval corresponding to a plurality of said cycles after the measuring means fails to perform a measuring operation due to absence of a token at the measuring points the last mentioned means stopping the driving means after said interval if no token is measured within the interval.

6. Recording mechanism according to claim 5 on which the last mentioned means reestablishes the time interval anew each time the measuring means fails to measure a token.

7. Recording mechanism for coins comprising means providing a receptacle for coins, means for advancing coins singly from said receptacle to a point of measurement, measuring means movable to engage, and to be positioned by an edge of a coin to measure a transverse dimension thereof, stop means positioned by said measuring means in definite locations each of which is determined by a predetermined range of positions of the measuring means, at least one counter, means for selectively advancing said counter, reciprocating means, and pawl means carried by said reciprocating means and settable by said stop means to different positions depending on the position of said stop means at the extreme of the travel of said reciprocating means in one direction, said pawl means selectively engaging and operating said means for advancing said counter on the return stroke of said reciprocating means to different extents depending on the position in which said pawl means is set.

References Cited

UNITED STATES PATENTS

| | | | |
|---|---|---|---|
| 2,366,882 | 1/1945 | Thompson | 235—32 |
| 2,578,226 | 12/1951 | Cavanagh | 235—32 |
| 2,685,406 | 8/1954 | Haas et al. | 235—32 |

RICHARD B. WILKINSON, *Primary Examiner.*

LAWRENCE R. FRANKLIN, *Assistant Examiner.*